United States Patent
Johanning et al.

(10) Patent No.: US 10,630,845 B2
(45) Date of Patent: Apr. 21, 2020

(54) INTER-OPERABLE COMMUNICATION SYSTEM

(71) Applicant: AGILE INTEROPERABLE SOLUTIONS, LLC, West Bloomfield, MI (US)

(72) Inventors: Daniel Johanning, Sunrise, FL (US); Shehryar Wahid, Sunrise, FL (US)

(73) Assignee: Agile Interoperable Solutions, LLC, West Bloomfield, MI (US)

( * ) Notice: Subject to any disclaimer, the term of this patent is extended or adjusted under 35 U.S.C. 154(b) by 103 days.

(21) Appl. No.: 15/440,820

(22) Filed: Feb. 23, 2017

(65) Prior Publication Data

US 2018/0227428 A1    Aug. 9, 2018

Related U.S. Application Data

(60) Provisional application No. 62/455,977, filed on Feb. 7, 2017.

(51) Int. Cl.
| | |
|---|---|
| *H04W 4/10* | (2009.01) |
| *H04W 4/90* | (2018.01) |
| *H04M 7/00* | (2006.01) |
| *H04L 29/06* | (2006.01) |
| *H04W 92/02* | (2009.01) |

(52) U.S. Cl.
CPC ...... *H04M 7/0069* (2013.01); *H04L 65/1023* (2013.01); *H04L 65/1059* (2013.01); *H04L 65/1083* (2013.01); *H04W 4/10* (2013.01); *H04W 4/90* (2018.02); *H04M 2207/203* (2013.01); *H04M 2207/206* (2013.01); *H04M 2242/04* (2013.01); *H04W 92/02* (2013.01)

(58) Field of Classification Search
CPC ............... H04L 65/104; H04L 65/1023; H04L 65/1059; H04L 65/1083; H04W 4/10; H04W 4/90; H04W 76/45; H04M 7/0069
USPC ......... 370/260, 312, 462, 265; 709/204, 226
See application file for complete search history.

(56) References Cited

U.S. PATENT DOCUMENTS

| | | | |
|---|---|---|---|
| 6,665,393 B1 | 12/2003 | Johnson et al. | |
| 7,529,200 B2 | 5/2009 | Schmidt et al. | |
| 7,801,953 B1* | 9/2010 | Denman | H04W 4/10 709/204 |

(Continued)

*Primary Examiner* — Harun Chowdhury
(74) *Attorney, Agent, or Firm* — Blue Filament Law PLLC

(57) ABSTRACT

A deployable interoperable communication system is provided that provides integrated and redundant communications between radio, cellular, and landline phone platforms for voice, text, video, and data transmission. The interoperable communication system integrates with existing radios, cellular phones, and emergency management communications systems illustratively including: command and control, incident management, video management, Physical Security Information Management (PSIM), and more. The interoperable communication system enables any caller to establish communication with another user or radio channel with no knowledge of technology or frequency assignment, and without need to modify or otherwise manipulate the calling device, such as re-programming a land mobile radio. Voice prompts queue the caller with instructions to connect to appropriate line or radio channel with a few simple button presses. None of the transmission is clipped; the caller has no need to hesitate to speak after pushing their talk button.

16 Claims, 9 Drawing Sheets

(56) References Cited

U.S. PATENT DOCUMENTS

| | | |
|---|---|---|
| 9,036,635 B2 | 5/2015 | Pandey et al. |
| 9,161,386 B1 | 10/2015 | Beghini et al. |
| 9,231,711 B2 | 1/2016 | Ericson |
| 2003/0004744 A1* | 1/2003 | Greene .......... G06Q 10/063112 705/1.1 |
| 2009/0097462 A1 | 4/2009 | Ganley et al. |
| 2012/0231787 A1* | 9/2012 | Conner .................. H04L 12/66 455/426.1 |
| 2012/0302212 A1* | 11/2012 | Ross ..................... H04W 12/06 455/411 |
| 2013/0166580 A1* | 6/2013 | Maharajh .............. H04L 65/605 707/758 |
| 2014/0215078 A1* | 7/2014 | Seth ..................... H04W 4/203 709/226 |
| 2015/0201328 A1 | 7/2015 | Klein et al. |
| 2016/0269876 A1* | 9/2016 | Senese ................. H04L 61/106 |
| 2017/0094523 A1* | 3/2017 | Mazzarella ............ H04W 4/90 |
| 2017/0272375 A1* | 9/2017 | Muesch ................ H04L 43/087 |
| 2018/0198766 A1* | 7/2018 | Moon ....................... H04L 9/08 |

\* cited by examiner

| Component | Details |
|---|---|
| Console, Rackmount, 1U, Dual Rail, 17" LCD with Keyboard, Tripp-Lite B021-02R-17 | • Portable Rack Server, 12U, Rack Solutions, Rack-117.12<br>• Casters/Wheels, Portable Rack, Rack Solutions, Rack-117-Mobile-Kit |
| Radio Head, Kenwood, TK-8180, Raytheon Connection Cord, Antenna, Mic, Power Supply, DC, Astron, SS-10TK-7180 on Slide Out Shelf (2U) | • Computer Shelf, Sliding, 24", Rack Solutions, 112-1534<br>• Operating Software, Linux, Red Hat (On TalkBox Operations Server)<br>• PBX Software, Free PBX (On TalkBox Operations Server) |
| Open | |
| Extension PBS Line Hub, Grandstream, GXW4224 (1U) | • Operating Software, Windows Server 2012 R2 (On Client Server)<br>• Raytheon Software, ACU Controller (On Client Server) |
| Cloud Router Switch, MikroTik, CRS125-24G-1S-RM (1U) | • Remote Desktop Software, Windows (On Client Server)<br>• Antenna, Cellular<br>• Phone, Analogue |
| Cable Management Panel (1U) | |
| Interoperability Gateway, Raytheon, ACU-2000 (3U), 3 - SCM-2 Radio/SIP Interface Modules, 4 - DSP-2 IP Modules | • Radio, Portable, Kenwood with Charging Base<br>• Phone Handset, Raytheon<br>• 4 - Cat 6, Orange, 1 Meter<br>• 3 - Cat 6, Black, 1 Meter<br>• 3 - Cat 6, Green, 1 Meter<br>• 1 - Cat 6, Light Gray, 1 Meter |
| TalkBox Operations Server, Dell, R620 Server, (1U) | |
| Client Server, Dell, R620 Server, (1U) | |

FIG. 4A

| Component | Details |
|---|---|
| Console, Rackmount, 1U, 19" LCD with Keyboard, Tripp-Lite B021-000-17 | • Hardened Case, Pelican-Hardigg, 4 Casters, Water Resistant, Pressure Seal, 14U Rack, 160-200 LBs. Rating |
| Radio Head, Kenwood, TK-8180, Raytheon Connection Cord, Antenna, Mic, on Slide Out Shelf (2U) | • Sliding Tray<br>• Non Floating Slides for Tray, General Devices, C-300-S-422-RC-35<br>• Operating Software, Linux, Red Hat (On TalkBox Operations Server)<br>• PBX Software, Free PBX (On TalkBox Operations Server) |
| Cloud Router Switch, MikroTik, CRS125-24G-1S-RM (1U) | • Operating Software, Windows Server 2012 R2 (On Client Server) |
| Cable Management Panel (1U) | • Raytheon Software, ACU Controller (On Client Server)<br>• Remote Desktop Software, Windows (On Client Server) |
| Interoperability Gateway, Raytheon, ACU-2000 (3U), 3 - SCM-2 Radio/SIP Interface Modules, 4 - DSP-2 IP Modules | • Antenna, Cellular<br>• Phone, Analogue<br>• Radio, Portable, Kenwood with Charging Base<br>• Phone Handset, Raytheon<br>• Guest WiFi, MikroTik, Routerboard, BaseBox 2, with 2 Antennas, Cat 6 Cable |
| Cellular Gateway, TELLES, TELLES iGATE (2U), 3 Sim Cards | • 2 POE Injectors<br>• 4 - Cat 6, Orange, 1 Meter<br>• 3 - Cat 6, Black, 1 Meter |
| TalkBox Operations Server, Dell, R320 (1U) | • 1 - Cat 6, Green, 1 Meter<br>• 2 - Cat 6, Light Gray, 1 Meter<br>• 2 - Cat 6, Light Gray, 2 Meters<br>• 1 - Cat 6, Red, 1 Meter |
| Client Server, SUN, Netra X3-2, (2U) | • 1 - Cat 6, Blue, 1 Meter |
| Uninterrupted Power Supply, APC Smart-UPS 3000VA (2U) | |

FIG. 5A

INTER-OPERABLE COMMUNICATION SYSTEM

CROSS-REFERENCE TO RELATED APPLICATION

This application claims priority of U.S. Provisional Patent Application Ser. No. 62/455,977 filed Feb. 7, 2017, which is incorporated herein by reference.

TECHNICAL FIELD

The present invention in general relates to the field of communications, and more particularly to an interoperable communication system that provides integrated and redundant communications between radio, cellular, and landline phone platforms for voice, text, and data transmission.

BACKGROUND

Interoperability of first responders' communications systems is a recognized and ongoing problem. Large scale emergencies including natural and manmade disasters often require first responders from many different municipalities, government agencies, and in some instances even private agencies to communicate and coordinate activities. However, existing state and local agencies may have communication systems with varying levels of technological maturity and operate on disparate platforms that are not compatible. Furthermore, many jurisdictions plan to continue to use their legacy networks for mission critical voice communications for years to come, because of cost, acquisition timing, and existing policies, all of which will cause the interoperability problem to persist. The interoperability problem is so severe that the Federal Government has authorized a multi-year development of a Nationwide Public Safety Broadband Network (NPSBN) to enable the necessary interoperability. But NPSBN is years away.

Traditional solutions to emergency communications integration and interoperability have been beyond the reach of most local communities. While the military and Federal agencies have employed capable, sophisticated equipment, developed and deployed at high cost, to overcome the interoperability and integration problem, state and local jurisdictions remain dependent on the envisioned public safety network, still years away.

Thus, there exists a need for a cost effective and easily deployable interoperable communication system that provides integrated and redundant communications between radio, cellular, and landline phone platforms for voice, text, and data transmission

SUMMARY OF THE INVENTION

An interoperable communication system is provided. The interoperable communication system has a set of electronic components that include a session internet protocol (SIP) registrar, a SIP user agent that forms a radio/voice over internet (VoIP) gateway that registers to the SIP registrar, a computer server in electrical communication with the SIP registrar, the SIP user agent and an internal router, where the internal router provides internal internet protocols (IPS) to the SIP registrar, to the SIP user agent, and to the computer server. The interoperable communication system further includes a switch/router for external voice and data connections, where the interoperable communication system provides communications between land mobile radio to cellular/satellite telephone, or land mobile radio to landline/hardline telephone without clipping of a transmitted message.

A non-transitory computer-readable medium is provided for operation of an interoperable communication system. The non-transitory computer-readable medium includes instructions stored thereon, that when executed on a processor, perform the steps of: determining whether a source input voice is via land mobile radio (LMR), cellular, voice over IP (VoIP), analog phone line, or fiber/digital phone line, where if the source input voice is via a calling LMR the process continues as follows: determining an incoming frequency of the LMR; comparing the incoming frequency of the LMR to a standard frequency being used by a group of LMR in a network, where if the incoming frequency is the same as the standard frequency then direct communication with other LMR in the group or to cellular, landline phone, or VoIP is initiated and no further communication interconnections are needed from the interoperable communication system. However, if the incoming frequency differs the process continues as follows: converting the source input voice to a standardized format of SIP (session Internet protocol); determining whether the calling LMR has DTMF tone capability, where if the calling LMR has DTMF capability a caller is directed by IVR (interactive voice response) to select an output of choice to whom the caller is trying to reach via DTMF tone responses. However, if the calling LMR does not have DTMF capability a user of the calling LMR is automatically provided with a human operator in order to complete the direction of the call to the desired output of choice outgoing connection.

BRIEF DESCRIPTION OF THE DRAWINGS

Examples illustrative of embodiments are described below with reference to figures attached hereto. In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

FIGS. 4A and 4B depict the front and back view, respectively of equipment for a fixed facility interoperable communication system in accordance with embodiments of the invention;

FIGS. 5A and 5B depict the front and back view, respectively of equipment for a field deployable ruggedized interoperable communication system in accordance with embodiments of the invention;

DETAILED DESCRIPTION

Figure 1:
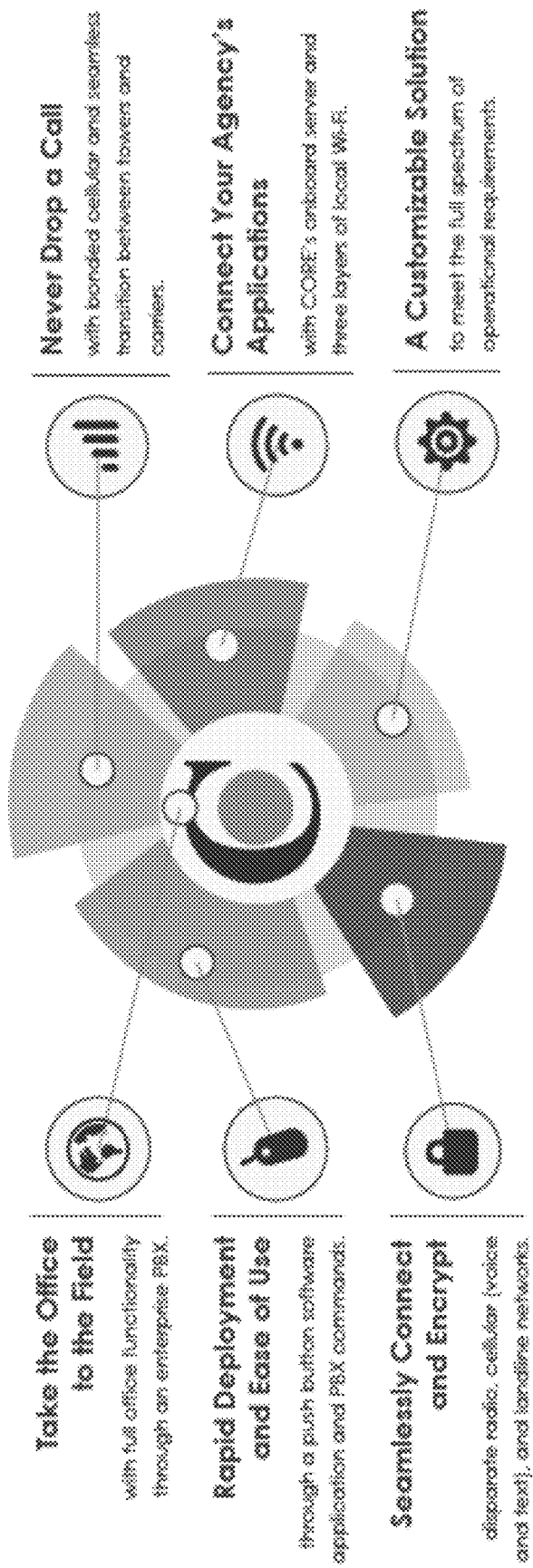
FIG. 1 is a diagram showing some of the features and aspects of embodiments of the inventive interoperable communication system.

The present invention has utility as inter-agency communications system that accommodates disparate protocols and can be hardened to tolerate field deployment. The present invention is described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment can be deleted from that embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations and variations thereof.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

All publications, patent applications, patents, and other references mentioned herein are incorporated by reference in their entirety.

Definitions

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Direct Inward Dialing (DID) is a service of a local phone company (or local exchange carrier) that provides a block of telephone numbers for calling into a company's private branch exchange (PBX) system.

Dual tone multi frequency (DTMF) is the signal to the phone company that is generated when pressing an ordinary telephone's touch keys.

Interactive voice response (IVR) is a technology that allows a computer to interact with humans through the use of voice and DTMF tones input via keypad.

Long-Term Evolution (LTE) is a standard for high-speed wireless communication for mobile phones and data terminals, based on the GSM/EDGE and UMTS/HSPA technologies.

Private automatic branch exchange (PABX) is an automatic telephone switching system within a private enterprise.

PBX (private branch exchange) is a telephone system within an enterprise that switches calls between enterprise users on local lines while allowing all users to share a certain number of external phone lines.

Physical Security Information Management (PSIM) is a category of software that provides a platform and applications created by middleware developers, designed to integrate multiple unconnected security applications and devices and control them through one comprehensive user interface.

Public switched telephone network (PSTN) is the world's collection of interconnected voice-oriented public telephone networks, both commercial and government-owned. It's also referred to as the Plain Old Telephone Service (POTS).

Registrar is a SIP endpoint that accepts REGISTER requests, recording the address and other parameters from the user agent, and that provides a location service for subsequent requests. The location service links one or more IP addresses to the SIP URI of the registering agent.

Session Internet protocol (SIP) is a standards-based open protocol used to create, manage, and terminate sessions in an IP based network. SIP enables the convergence of voice, data, and video, allowing equipment with varying media capabilities to be conferenced together. An essential component of the protocol is a determination of the services supported by each of the different types of communications equipment in the conference, so that any services held in common can be exchanged between them.

Short Message Service (SMS) is a text messaging service component of most telephone, Internet, and mobile telephony systems. SMS uses standardized communication protocols to enable fixedline/landline or mobile phone devices to exchange short text messages.

Voice over Internet Protocol (VoIP) is a category of hardware and software that enables people to use the Internet as the transmission medium for voice calls.

ZRTP (composed of Z and Real-time Transport Protocol) is a cryptographic key-agreement protocol to negotiate the keys for encryption between two end points in a Voice over Internet Protocol (VoIP) phone telephony call based on the Real-time Transport Protocol.

The present invention has utility as a deployable interoperable communication system that provides integrated and redundant communications between radio, cellular, and landline phone platforms for voice, text, video, and data transmission. Embodiments of the inventive interoperable communication system integrate with existing radios, cellular phones, and emergency management communications systems illustratively including: command and control, incident management, video management, Physical Security Information Management (PSIM), and more.

Embodiments of the inventive interoperable communication system enable any caller to establish communication with another user or radio channel with no knowledge of technology or frequency assignment, and without need to modify or otherwise manipulate the calling device, such as re-programming a land mobile radio. Voice prompts queue the caller with instructions to connect to appropriate line or radio channel with a few simple button presses. None of the transmission is clipped; the caller has no need to hesitate to speak after pushing their talk button.

Embodiments of the inventive interoperable communication system have multiple devices connected together and configurable in a portable container or installable in a rack for use in a mobile vehicle or fixed location. The critical software for the caller directed dialing resides on one of the devices and communicates to the other devices in a manner that allows the features of interoperability and caller directed dialing to occur. Furthermore, novel software for controlling transmission quality and avoidance of clipped transmissions also resides on one of the devices that form the inventive interoperable communication system. Operating system (OS) software used in embodiments of the inventive interoperable communication system illustratively include Linux and Windows based OS. A novel PABX script is used as a handshake/naming convention for the individual electronic components that make up the interoperable communication system. In a specific inventive embodiment, Asterix13 an open source communications software development tool with a GUI interface is used to load in the command line interface code. The novel command line interface code allows the use of existing off the shelf devices that make up the interoperable system to work together seamlessly and provide non-clipped voice communication between land mobile radio (LMR) and cellular, landline phone, and other platforms for voice, text, video, and data transmission as described in detail below.

Embodiments of the inventive interoperable communication system serve as a virtual switchboard permitting intercommunication between the various modes and devices that the response team members now utilize. In a matter of minutes the inventive interoperable communication system can establish the necessary intermodal networks. A few clicks of the mouse, or taps on the tablet, and law enforcement, emergency medical services (EMS), and other personnel are interconnected to coordinate in the vital business of saving lives and property. Continuity of communications is maintained with an internal battery capable of sustaining one half hour or more of operation, and ensures interoperability during those first critical minutes of an emergency. Drawing only 650 watts for operation with 1200 watts at start-up, the inventive interoperable communication system can be maintained indefinitely on a small portable generator. For example, the system can operate for about 6 hours on 1 gallon of fuel. In a specific inventive embodiment, the interoperable communication system is housed in a waterproof military specifications approved hardened case with shock mounted standard width computer rack with a footprint of 42 inches×30 inches×27 inches (L×W×H).

Embodiments of the interoperable communication system may be set up in approximately 15 minutes with push-button setup and requiring minimal technical requirements and 5 minute start up that is plug-and-play configured with connectivity via cellular, fiber, 802.11 a/b/g/n/ac, PIP, PIMP, mesh, Wi-Fi, DSL, satellite, microwave, Wi-Fi to WAN, MANET, Mi-Mo, troposcatter, or any standard network connection. In a specific inventive embodiment, on board Wi-Fi is available to up to 500 users and 10 WAN connections, with optional external Wi-Fi available for up to 200 users. Among the features available in inventive embodiments of the interoperable communication system illustratively include: radio, voice, and data interoperability; seamless connection to any type of radio; standalone operation; Internet (backhaul) operation; local configuration; remote configuration; managed voice priority; android and IOS compatible; management console; does not require push to talk (PTT); managed user authorization levels; and software updates available both locally and remotely. Audio communication protocols that may be compatible with embodiments of the interoperable communication system illustratively include G711u/a, GSM, G719, G722, G723, G726, G729, SPEEX, ADPCM, ILBC, SIREN7/14, SILK, SLIN, LPC10, and OP. Video communication protocols that may be compatible with embodiments of the interoperable communication system illustratively include H264, MPEG4, VP8, H263/p, H261 Microsoft lync, compatible (WRTC) SMS: SMPP, XMPP. Radio communication protocols that may be compatible with embodiments of the interoperable communication system illustratively include VHF, UHF, HF, 700 mHz, 800 mHz, 900 mHz, Trunked, p25, sideband, (all analog/digital with IP interface).

Embodiments of the inventive interoperable communication system enable an authorized user (user) to establish secure communications with another user utilizing available communication devices. Embodiments of the inventive interoperable communication system are simple to use and do not require the user to have a high technical skill level. The user does not need to manipulate the sending or receiving devices such as re-programming a land mobile radio to initiate a communication link with a user on a different communication platform. Thus, when utilizing a land mobile radio (LMR) there are no changes to the standard use protocol. The user simply turns on the land mobile device, selects the appropriate frequency and adjusts the volume. In order to talk, the user pushes the transmit button and speaks into the radio, and in order to receive, the user simply listens to the radio traffic and receives the radio traffic. Embodiments of the inventive interoperable communication system work with any type of land mobile radio (LMR), analog or digital from all manufacturers. Features supported by embodiments of the inventive interoperable communication system include: radio to IP interface (ROIP); interconnect radios with each other and with VoIP, landline, cellular, data, and Wi-Fi; integration of multiple LMR networks, maintaining network encryption for voice and data; and the ability to add handheld and mobile radios in the field and "on the fly". Encryption may illustratively include ZRTP media encryption, 256 bit data encryption, where the encryption is FIPS compliant. Further radio interoperable features illustratively include seamless connectivity to any radio, up to 8 radios with up to 30 optional, optional radio repeater, 1000+ talk groups, trunking, digital, TETRA, P25, UHF, VHF, HF, and HAM.

In terms of wireless cellular voice and data networks or plain old telephone (POTs) (landline/hardline telephone connections) there are no changes to the standard use protocol with embodiments of the inventive interoperable communication system. Embodiments of the interoperable communication system extend radio-style push-to-talk communications to any user equipped with a cellular phone. The user dials an access number to the interoperable communication system, and voice prompts are provided that guide the calling user through the PBX (private branch exchange) queue with instructions to connect to an appropriate line or radio channel, that may be accomplished with a few simple button presses. Embodiments of the interoperable communication system provide: cutting edge cellular, data, and voice encryption via onboard cellular gateway; GSM, UMTS, 2G, 3G, 4G, LTE network compatibility and First-Net (band 14) ready; up to 16 concurrent cellular sessions; multiple simultaneous carriers (service providers); LTE and 3G bonding for increased bandwidth; seamless tower passoff between carriers; and a smart phone application (app).

Outgoing communications from an enterprise-grade PBX (landline/VoIP network) phone system to a user of the interoperable communication system is completed by simply picking up a phone. Features provided by embodiments of the inventive interoperable communication system include: dedicated phone numbers; extensions; voicemail; full voice recording; IVR call routing; integration with existing phone systems; and conference bridging. Additional telco features provided by inventive embodiments of the interoperable communication system illustratively include: a single inbound access number; 1000+ extensions; use of existing extensions; ability to create event specific extensions; voicemail; connect to radio, smart phone, landline, IP phone, Iridium phone, Star phone, analogue phone, cordless phone; and user assignable direct inward dialing (DID) (Optional).

Furthermore, when using embodiments of the inventive interoperable communication system for communications between seemingly disparate devices, none of the transmission is lost or "clipped" during a conversation. This includes land mobile radio to cellular telephone or landline/hardline telephone. The lack of clipping in audio transmission is particularly important as a land mobile radio typically utilizes a "push-to-talk" feature while telephones do not require a button to be pushed to talk.

Embodiments of the inventive interoperable communication system may be deployed in several configurations illustratively including in a portable, rugged case, or permanently configured in a standard networking rack. The interoperable communication system may have a small footprint and be light weight (e.g., less than 100 pounds) with low power consumption. The interoperable communication system may be transported and simultaneously used in a mobile command center, trailer, or even a small truck or sport utility vehicle (SUV). The interoperable communication system may be permanently installed in a facility, mobile command center, or a trailer.

Embodiments of the inventive interoperable communication system go beyond radio and cellular voice communications, and may incorporate any form of data, including short message service (SMS) and video. The integration of voice and data into one command and control platform is a powerful tool for public and private sector entities to use on-demand for an event, critical incident, or for daily use. The interoperable communication system may be integrated into, and works seamlessly with, existing communication and data platforms.

In a specific inventive embodiment, the interoperable communication system is based on a multi-band cellular LTE platform, including FirstNet. When an external network (backhaul) connection is needed, the interoperable communication system may be connected to any type of backhaul illustratively including cellular, fiber, Wi-Fi, microwave, and satellite. In a specific inventive embodiment, the interoperable communication system has three layers of Wi-Fi onboard typically designated for 1) administrative use, 2) authorized users/onsite personnel, and 3) cameras and machines. With the multi-layered Wi-Fi service embodiments of the interoperable communication system can establish secure voice and data networks where no networks currently exist. Features provided by embodiments of the inventive interoperable communication system include: customizable multi-layered Wi-Fi; high-powered mesh network; scalable user availability based on bandwidth; adaptability to client (user) security policies and permissions; and can be extended and transmitted to multiple additional sites.

Embodiments of the inventive interoperable communication system are configurable and may be tailored to meet a customer's current and future requirements. Configurations provided by embodiments of the inventive interoperable communication system include: server-room configurations; mobile command center configurations; in-vehicle configurations; and man-portable configurations.

Embodiments of the inventive interoperable communication system are upgradeable and use an expandable, upgradeable, and enhanceable architecture. Upgrade capabilities and features illustratively include: onsite and remote software upgrades; parts and component that can be exchanged without modifying a unit; additional capabilities may be added; and three onboard servers including a client use server for software apps and data.

Embodiments of the inventive interoperable communication system differ from currently available solutions in that the self-contained communications solution offers these features and capabilities:
the ability to work within a local, independent environment or a robust networked environment
the ability to be deployed in a rugged, portable case or installed in a standard networking rack
the ability to provide a standard network/data environment
an onboard server for user defined software programs or systems
eight or more WAN connections depending on configuration
a managed voice priority system
a managed user authorization system
the ability to encrypt all voice and data transmissions
an unlimited number of talkgroups
up to eight radios may be connected, with an option for a total of 30 connected radios
an onboard cellular gateway with the ability to utilize LTE, 4G, 3G and 2G technologies
the ability to operate multi-bands in cellular and LTE, including FirstNet
an onboard cellular gateway with the ability to "bond" multiple carriers into one combined seamless cellular backhaul
the ability to work with all cellular service providers/carriers
the ability to work with international providers/carriers
16 onboard cellular channels that can be load balanced
up to 60 onboard sim cards
unlimited number of virtual sim cards (optional)
2PRI and 32 FXS/FXO
a SMPP SMS gateway system with 100 message/second throughput
an encrypted mobile application that is android and IOS compatible Referring now to the figures, FIG. 1 is a diagram showing some of the features and aspects of embodiments of the inventive interoperable communication system. As symbolically shown in FIG. 1 embodiments of the inventive interoperable communication system provide users with the ability to extend their office to the field through enterprise PBX, rapid deployment and ease of use, seamless and secure connections between disparate communication devices, reliable cellular communications, three layers of Wi-Fi for user applications (app), and customizable solutions to meet user requirements.

Figure 2:
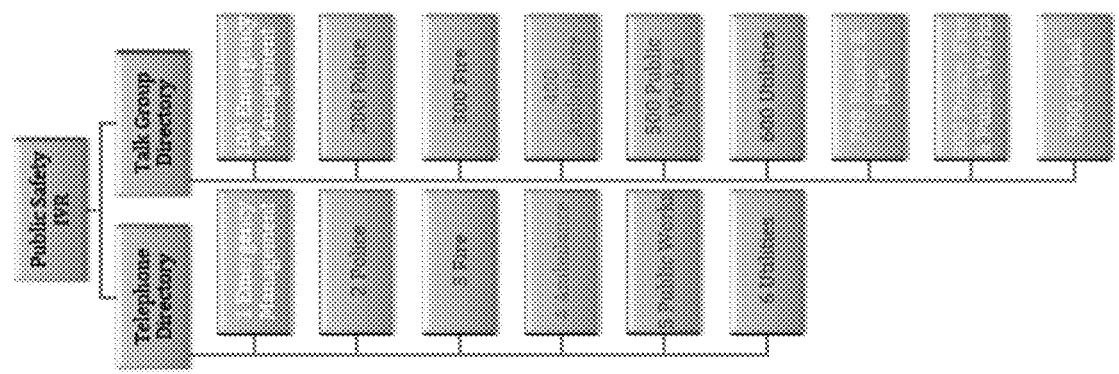
FIG. 2 depicts an interactive voice response (IVR) chart used in embodiments of the inventive interoperable communication system.

FIG. 2 depicts an interactive voice response (IVR) chart used in embodiments of the inventive interoperable communication system. The IVR chart is a
directory tree which shows the responses that a user must use to reach a particular resource or option. The IVR chart may be presented as part of a graphical user interface (GUI) in an app, or as audio and DTMF tone prompts during a call or radio connection.

Figure 3:
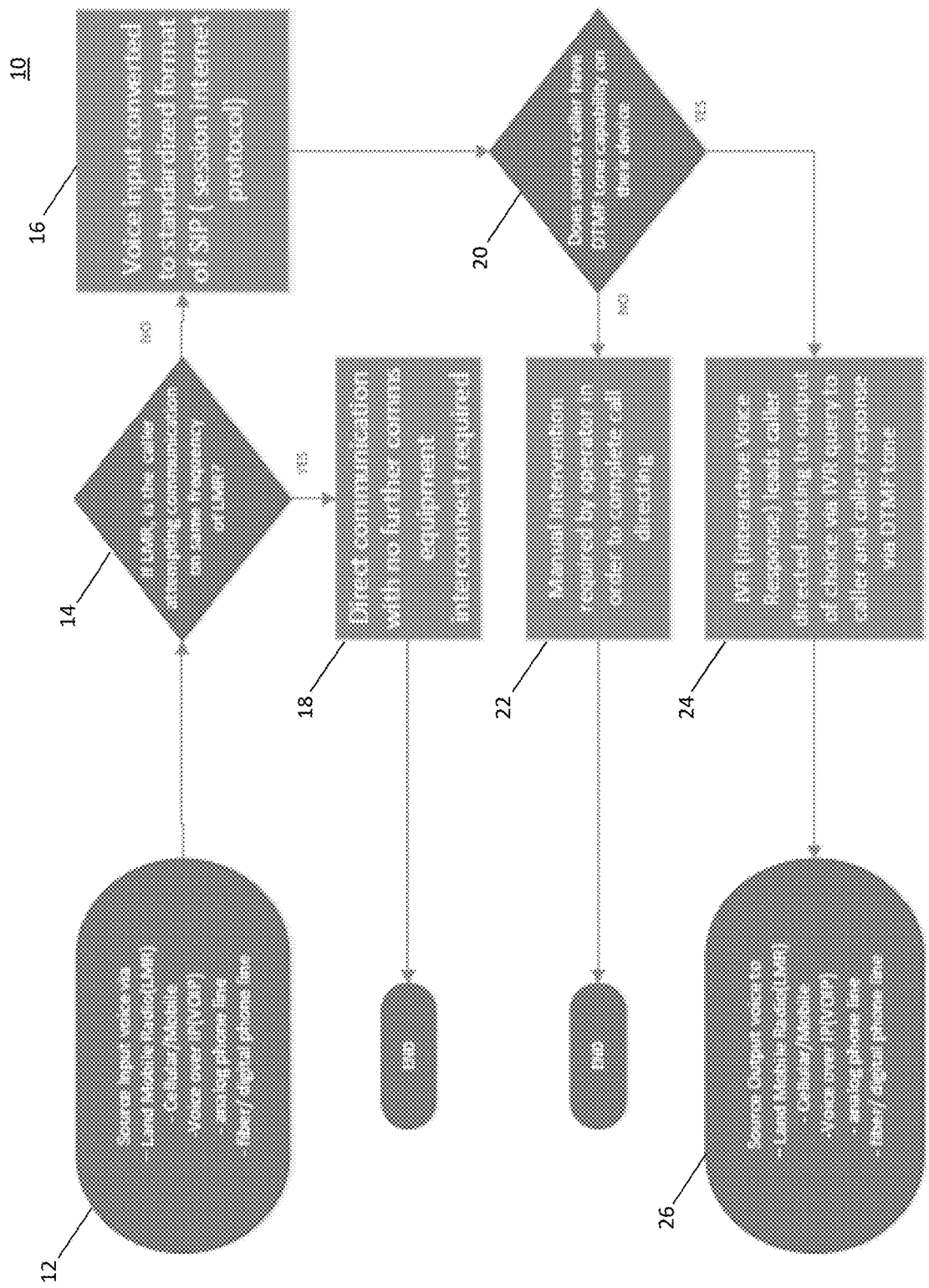
FIG. 3 depicts an automated process flow controlled by software in the interoperable communication system in accordance with embodiments of the invention.

FIG. 3 depicts an automated process flow 10 controlled by software in the interoperable communication system. The system determines whether the source input voice is via land mobile radio (LMR), cellular, voice over IP (VOIP), analog phone line, or fiber/digital phone line (block 12). If it is determined that the source input originates from a LMR source the frequency of the LMR is compared to the standard frequency being used by LMR in the network. If the LMR the caller is using is at the same frequency (Decision block 14 is Yes) then direct communication with other LMR or to cellular, landline phone, or VoIP is initiated and no further communication interconnections are needed from the interoperable communication system (Block 18). If the LMR the caller is using is at a different frequency (Decision block 14 is No), the interoperable communication system converts the voice input to a standardized format illustratively including SIP (session Internet protocol) (Block 16). A determination is then made whether the calling user has DTMF tone capability on their radio device at decision block 20. If yes (Decision block 20 is Yes) then the caller is directed by IVR (interactive voice response) in block 24 to select the output of choice to whom the caller is trying to reach via DTMF tone responses, the choices of outgoing connections which are shown in block 26 as LMR, cellular, VoIP, and analog or digital phone. If the incoming caller on the LMR does not have DTMF tone response (Decision block 20 is No), the user is automatically provided with a human operator in order to complete the direction of the call to the desired outgoing connection (Block 22).

Figure 4B:
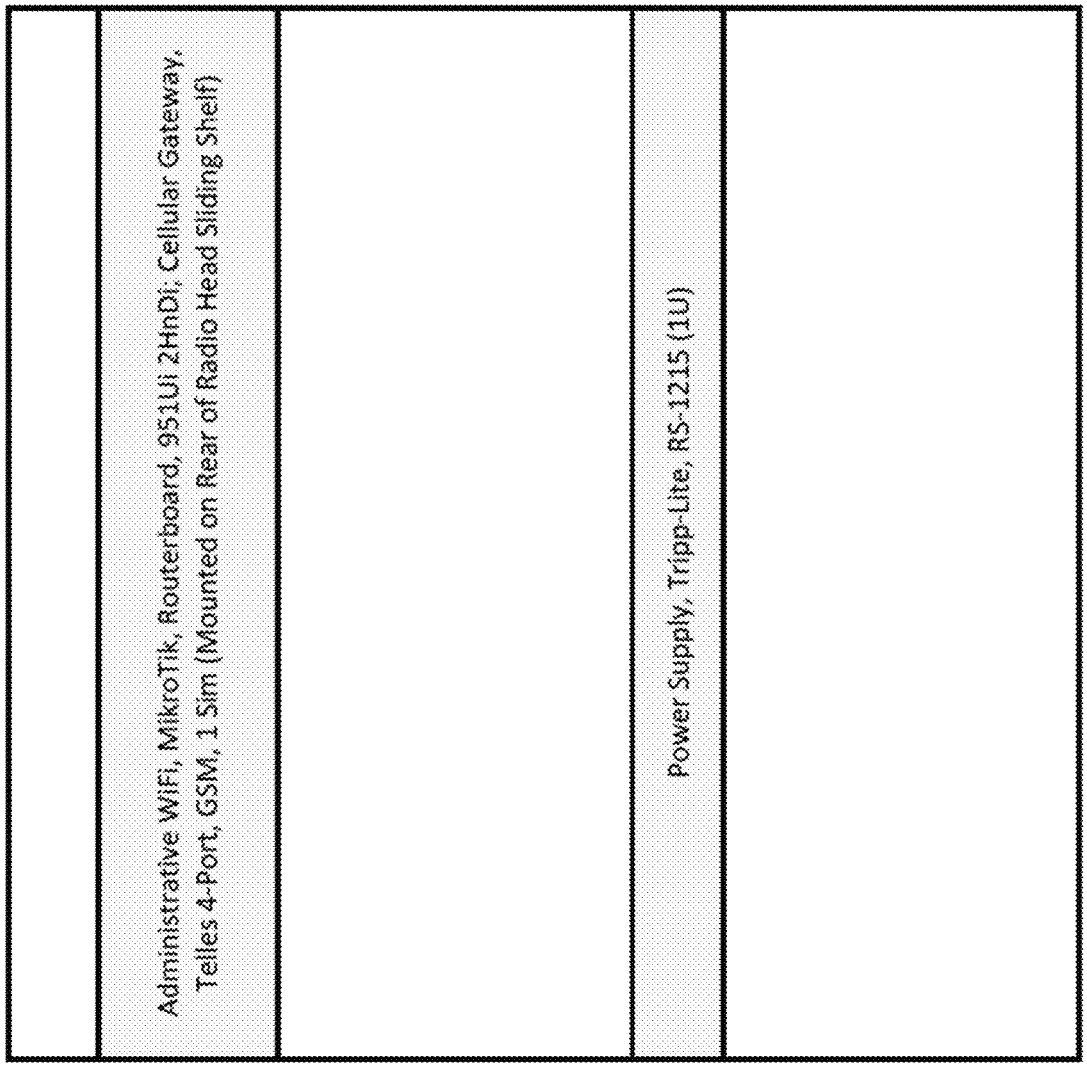

FIGS. 4A and 4B depict the front and back view, respectively of equipment for a fixed facility interoperable communication system. The fixed facility interoperable communication system may be rack mounted. Included in the system is a display with a GUI for entry of commands and software for running the system and other input devices including a keyboard and a mouse. Also shown are various radio equipment, switches, routers, interoperable gateway, SIP interface, digital signal processors, cellular gateway, and a computer server.

Figure 5B:
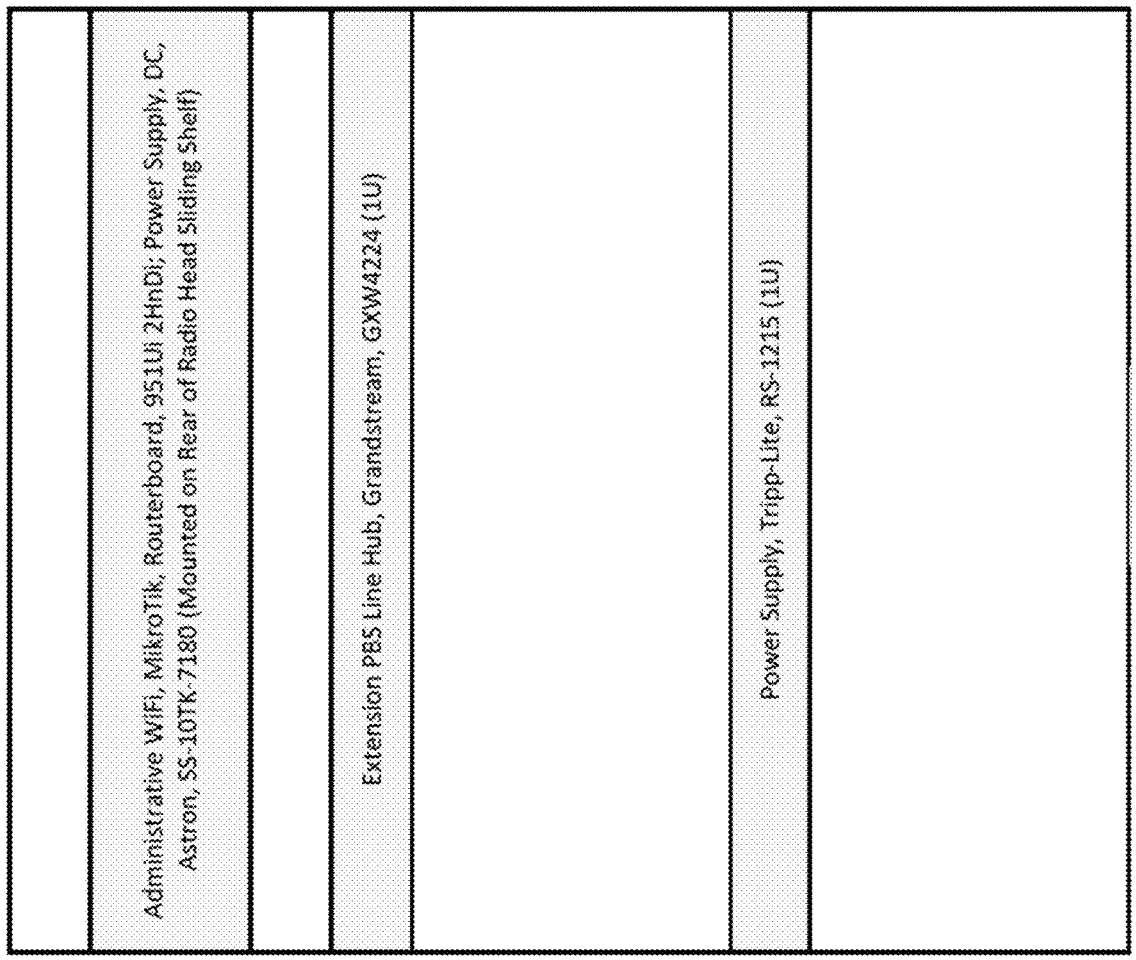

FIGS. 5A and 5B depict the front and back view, respectively of equipment for a field deployable ruggedized interoperable communication system. Included in the system is a display with a GUI for entry of commands and software for running the system and other input devices including a keyboard and a mouse. Also shown are various radio equipment, switches, routers, interoperable gateway, SIP interface, digital signal processors, cellular gateway, and a computer server.

Figure 6:
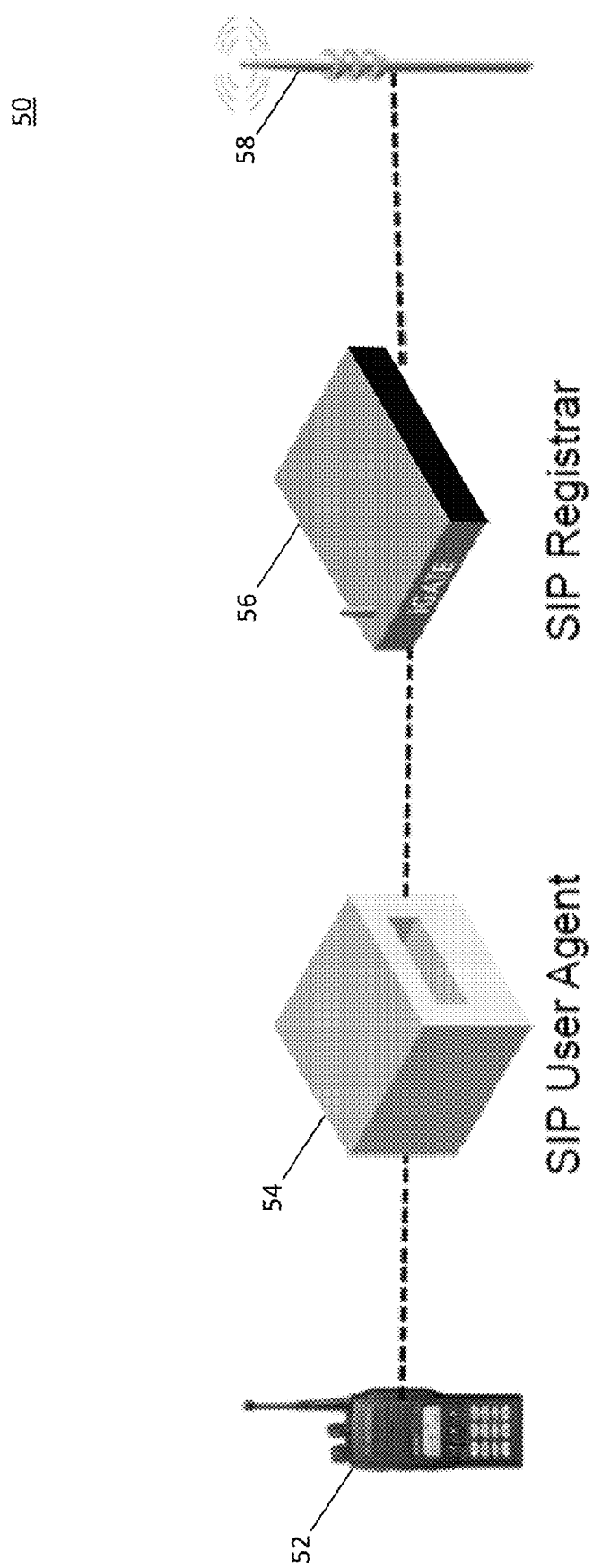
FIG. 6 depicts a representation of use cases including outbound radio call flow, inbound radio call flow, and operator assisted call flow in accordance with embodiments of the invention.

FIG. 6 depicts a representation 50 of use cases including outbound radio call flow, inbound radio call flow, and operator assisted call flow. In the instance of an outbound call initiated from a LMR 52, the SIP user agent 54, in the form of a radio/VoIP gateway, registers to the SIP registrar 56. The radio user is then prompted by SIP user agent 54 to dial DTMF tones on their radio 52. When the SIP user agent 54 recognizes the DTMF, the SIP user agent 54 sends the call out as a VoIP. The SIP registrar 56 receives the SIP call and sends call out as a cellular transmission signified by antenna 58, with automatic failover to another terminating leg (e.g., PRI, RJ11, etc.) if necessary. In an instance of an inbound radio call the flow of information is as follows. The SIP user agent 54, in the form of a radio/VoIP gateway, registers to the SIP registrar 56. The antenna 58 receives the call from the radio 52 and then at the SIP registrar 56. The SIP registrar 56 rings the SIP user agent 54, and the SIP user agent 54 subsequently connects the calling party to an IVR within the SIP user agent 54, and prompts the caller to select a desired talk group. The SIP user agent then connects the caller to the one or more radio users in the selected talk group. In an instance where an operator assisted call takes place, as was outlined in FIG. 3 when a calling user lacks DTMF capability, the SIP user agent 54 registers to the SIP registrar 56, and an operator uses a graphical user interface (GUI) of the SIP user agent 54 of the IVR, an embodiment of which is shown in FIG. 2, to build a talk group of two or more radios. The SIP user agent 54 is graphically added to the talk group, and the operator is prompted for a destination phone number, and the destination phone number is then sent to the SIP registrar 56. Any necessary failover is performed and the call is connected to the talk group.

Figure 7:
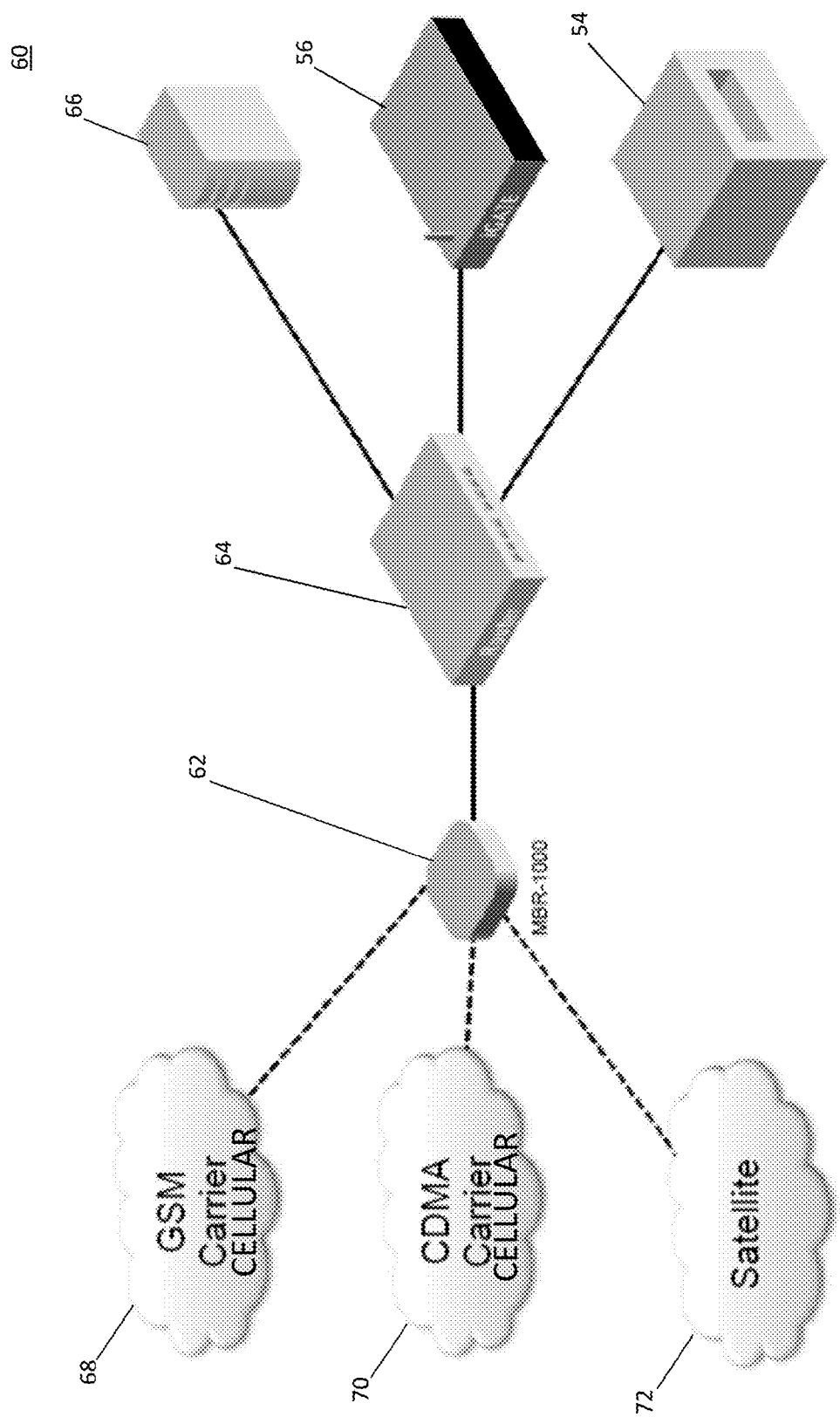
FIG. 7 illustrates a block diagram of Internet protocol (IP) network access in accordance with embodiments of the invention.

FIG. 7 illustrates a block diagram 60 of Internet protocol (IP) network access in accordance with embodiments of the invention. The equipment that forms the interoperable communication system includes the SIP user agent 54, the SIP registrar 56, internal router 64, and server 66, that are all positioned behind a switch/router 62.

In a specific inventive embodiment, the server runs on a version of Windows OS with a version of Linux illustratively including Ubunto. In a specific embodiment of the interoperable communication system the SIP registrar 56 is an iGate LCR (Least Cost Routing) that automatically routes calls from a PBX—via the least expensive route—to each destination, whether that is over a standard fixed-line network, a mobile network, or over the Internet. The LCR combines with other superior call-routing capabilities that are based on, for example, called party, CLIP/CLIR, time-of-day, time quota, service quality, and SIM card profile. The iGATE connects fixed telecommunications networks to mobile networks and enhances the functionality of a corporate PBX. Among the features of an iGate include: conversion of fixed-to-mobile calls into cost-saving mobile-to-mobile calls; integrated mobile number portability ends costly cross-network calls; integrated VoIP gateway; PSTN support (PRI and BRI, SS7); seamless integration into existing telecom infrastructures; fixed network backup via mobile; fully vGATE SIM Server compatible. In a specific embodiment of the interoperable communication system the SIP user agent 54 is a Raytheon ACU-2000IP radio/VoIP gateway that can handle up to twelve radio connections of any frequency through a patch cable. In a specific embodiment of the interoperable communication system the internal router 64 is an Imagestream Rebel router that provides internal IPS to the other components in the system. In a specific embodiment of the interoperable communication system the switch/router 62 is a Cradlepoint MBR-1000 four port switch with WLN/Lan with two universal serial bus (USB) for wireless data cards.

Continuing with FIG. 7 the internal router 64 uses the switch/router 62 as an outbound gateway that connects to almost any USB cellular device (shown as clouds GSM 68, CDMA 70, and satellite 72). Failover order is defined for the various USB modems (68, 70, 72) and a RJ45 uplink port. Links are constantly checked for connectivity and failover is performed as necessary.

OTHER EMBODIMENTS

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

The invention claimed is:

1. An interoperable communication system, said system comprising:
   a set of electronic components comprising:
      a session internet protocol (SIP) registrar;
      a SIP user agent that forms a radio/voice over internet (VoIP) gateway that registers to said SIP registrar;
      a computer server in electrical communication with said SIP registrar, said SIP user agent and an internal router, where said internal router provides internal internet protocols (IPS) to said SIP registrar, to said SIP user agent, and to said computer server;
      a switch/router for external voice and data connections;
   an operating system (OS), where the OS is a combination of Linux and Windows based OS, where a PABX script is used as a handshake/naming convention for individual electronic components of said set of electronic components that make up the interoperable communication system;
   wherein audio communication protocols that are compatible with said interoperable communication system comprise G711u/a, GSM, G719, G722, G723, G726, G729, SPEEX, ADPCM, ILBC, SIREN?/14, SILK, SLIN, LPC10, and OP;
   wherein Video communication protocols that are compatible with said interoperable communication system comprise H264, MPEG4, VP8, H263/p, H261 Microsoft Lync, compatible (WRTC) SMS: SMPP, and XMPP; and
   wherein said interoperable communication system provides communications between land mobile radio to cellular/satellite telephone or land mobile radio to landline/hardline telephone without clipping of a transmitted message.

2. The system of claim 1 wherein Asterix13 is used to load in a set of command line interface code that allows said set of electronic components to work together seamlessly and provide non-clipped voice communication.

3. The system of claim 1 wherein connectivity is provided via at least one of via cellular, fiber, 802.11 a/b/g/n/ac, PIP, PIMP, mesh, Wi-Fi, DSL, satellite, microwave, Wi-Fi to WAN, MANET, Mi-Mo, troposcatter, or any standard network connection.

4. The system of claim 1 wherein radio communication protocols that are compatible with said interoperable communication system comprise VHF, UHF, HF, 700 mHz, 800 mHz, 900 mHz, Trunked, p25, sideband, and all analog/digital with IP interface.

5. The system of claim 1 wherein encryption used in said interoperable communication system comprise ZRTP media encryption, and 256 bit data encryption, where the encryption is FIPS compliant.

6. The system of claim 1 further comprising a cellular gateway, said cellular gateway compatible with one or more of GSM, UMTS, 2G, 3G, 4G, LTE network compatibility and FirstNet; and
   wherein said cellular gateway can "bond" one or more cellular carriers into one combined cellular backhaul.

7. The system of claim 1 wherein the interoperable communication system is deployed in a portable, rugged case, or in a standard networking rack.

8. The system of claim 1 wherein the interoperable communication system further comprises three layers of Wi-Fi onboard designated for 1) administrative use, 2) authorized users/onsite personnel, and 3) cameras and machines.

9. The system of claim 1 wherein the interoperable communication system further comprises an interactive voice response (IVR) system.

10. The system of claim 9 wherein said IVR system is presented as part of a graphical user interface (GUI) in an app, or as audio and a set of DTMF tone prompts during a call or radio connection.

11. The system of claim 1 further comprising a display with a GUI and a keyboard and mouse.

12. An interoperable communication system, said system comprising:
   a set of electronic components comprising:
      a session internet protocol (SIP) registrar;
      a SIP user agent that forms a radio/voice over internet (VoIP) gateway that registers to said SIP registrar;
      a computer server in electrical communication with said SIP registrar, said SIP user agent and an internal router, where said internal router provides internal internet protocols (IPS) to said SIP registrar, to said SIP user agent, and to said computer server;
      a switch/router for external voice and data connections;
   an operating system (OS), where the OS is a combination of Linux and Windows based OS, where a PABX script is used as a handshake/naming convention for individual electronic components of said set of electronic components that make up the interoperable communication system;
      three layers of Wi-Fi onboard designated for 1) administrative use, 2) authorized users/onsite personnel, and 3) cameras and machines;
   wherein audio communication protocols that are compatible with said interoperable communication system comprise G711u/a, GSM, G719, G722, G723, G726, G729, SPEEX, ADPCM, ILBC, SIREN7/14, SILK, SLIN, LPC10, and OP;
   wherein Video communication protocols that are compatible with said interoperable communication system comprise H264, MPEG4, VP8, H263/p, H261 Microsoft lync, compatible (WRTC) SMS: SMPP, and XMPP; and
   wherein said interoperable communication system provides communications between land mobile radio to cellular/satellite telephone or land mobile radio to landline/hardline telephone without clipping of a transmitted message.

13. The system of claim 12 wherein Asterix13 is used to load in a set of command line interface code that allows said set of electronic components to work together seamlessly and provide non-clipped voice communication.

14. The system of claim 12 wherein connectivity is provided via at least one of via cellular, fiber, 802.11 a/b/g/n/ac, PIP, PIMP, mesh, Wi-Fi, DSL, satellite, microwave, Wi-Fi to WAN, MANET, Mi-Mo, troposcatter, or any standard network connection.

15. The system of claim 12 wherein radio communication protocols that are compatible with said interoperable communication system comprise VHF, UHF, HF, 700 mHz, 800 mHz, 900 mHz, Trunked, p25, sideband, and all analog/digital with IP interface.

16. The system of claim 12 wherein encryption used in said interoperable communication system comprise ZRTP media encryption, and 256 bit data encryption, where the encryption is FIPS compliant.

* * * * *